United States Patent [19]

Seltman

[11] 4,202,582
[45] May 13, 1980

[54] CYCLE SAFETY DISC

[76] Inventor: Irving E. Seltman, 806 A Round Pond Rd., Lake Ronkonkoma, N.Y. 11779

[21] Appl. No.: 946,142

[22] Filed: Sep. 27, 1978

[51] Int. Cl.² ............................................. B60B 7/00
[52] U.S. Cl. ................................ 301/37 SA; 403/408
[58] Field of Search ............ 40/587; 301/37 R, 37 SA, 301/37 H; 150/52 M, 54 R, 54 A, 54 B; 403/408

[56] References Cited

U.S. PATENT DOCUMENTS

| | | | |
|---|---|---|---|
| 3,141,704 | 7/1964 | Guingrich | 301/37 SA |
| 3,317,246 | 5/1967 | Wester | 301/37 SA |
| 3,602,550 | 8/1971 | Patane | 301/37 SA |

*Primary Examiner*—H. Grant Skaggs
*Attorney, Agent, or Firm*—Leonard W. Suroff

[57] ABSTRACT

A safety disc assembly for a bicycle having a wheel with an axle, rim and a plurality of radially extending spokes between the axle and rim. The safety disc assembly includes a first and second wheel disc, with each wheel disc adapted to be mounted on a bicycle wheel intermediate the rim and the axle on oppositely disposed sides of the spokes. The first and second wheel disc each includes a pair of co-acting disc members, with each one of the disc members including a contoured outer perimeter and a contoured inner perimeter with a terminal wall extending therebetween. The contoured perimeters are adapted to extend in spaced relationship to the rim and to the axle, respectively. Alignment structure for permitting abutting engagement between each pair of the disc members on the first and second wheel discs is provided so as to permit the disc members to be assembled on the wheel without the removal thereof from the bicycle. A coupling arrangement for removably retaining the first and second wheel discs in assembled relationship to each other on opposite sides of the spokes on the wheel is also provided.

4 Claims, 4 Drawing Figures

//4,202,582

CYCLE SAFETY DISC

BACKGROUND OF THE INVENTION

The present invention relates to a safety device for use with a bicycle, tricycle, etc., which has spokes on the wheel thereof.

It is well known that bicycles and other similar type devices having wheels fabricated using spokes can sometimes result in the accidental insertion of the shoe of the person using the bicycle, or someone getting a ride thereon, into the spokes.

To overcome this problem, the present invention provides for a cycle safety disc that may be readily installed on either the front or rear bicycle wheel without the wheel having to be removed. Removal of the wheel is not necessarily easily accomplished in certain bicycles that may have speed shifts associated therewith. Therefore, the present invention takes this into consideration by providing for a device which may be readily assembled onto an existing bicycle without the time and trouble that would be incurred if the bicycle wheel had to be first removed and then the device installed.

OBJECTS OF THE INVENTION

An object of the present invention is to provide a bicycle safety device that is readily installed to enclose the wheel sprockets.

Another object of the present invention is to provide a bicycle safety device that is inexpensive to manufacture and may be readily installed on new and existing bicycles and functions efficiently without diminishing the usability of the bicycle.

Another object of the present invention is to provide a safety device for bicycles thereby avoiding accident and injury to cyclists or their passengers.

Other objects and advantages of the present invention will become obvious as the disclosure proceeds.

SUMMARY OF THE INVENTION

The present invention is a safety disc assembly for a bicycle having a wheel with an axle, rim, and a plurality of radially extending spokes between the axle and rim. The safety disc assembly comprises a first and second wheel disc, with each wheel disc adapted to be mounted on a bicycle wheel intermediate the rim and the axle on oppositely disposed sides of the spokes. The first and second wheel discs each include a pair of coacting disc members, with each one of the disc members including a contoured outer perimeter and a contoured inner perimeter with a terminal wall extending therebetween. The contoured perimeters are dimensioned to extend in spaced relationship to the rim and to the axle, respectively.

Alignment means is provided for permitting abutting engagement between each pair of the disc members on the first and second wheel discs so as to permit the disc members to be assembled on the wheel without the removal thereof.

Coupling means for removably retaining the first and second wheel discs in assembled relationship to each other on opposite sides of the spokes on the wheel is provided and includes apertures in each one of the disc members, and a pair of fasteners adapted to extend through the apertures and spokes for removably securing the first and second wheel discs to each other on opposite sides of the spokes.

The alignment means includes a lip extending outwardly from the terminal wall on each one of the disc members, and the lips are adapted to extend in overlapping engagement with each other in the assembled position of each wheel disc. The lips are continuous and include a free end, an inner end and an outer end.

BRIEF DESCRIPTION OF THE DRAWINGS

For a better understanding of the invention, reference should be had to the accompanying drawings wherein.

DETAILED DESCRIPTION OF THE DRAWINGS

Figure 1:
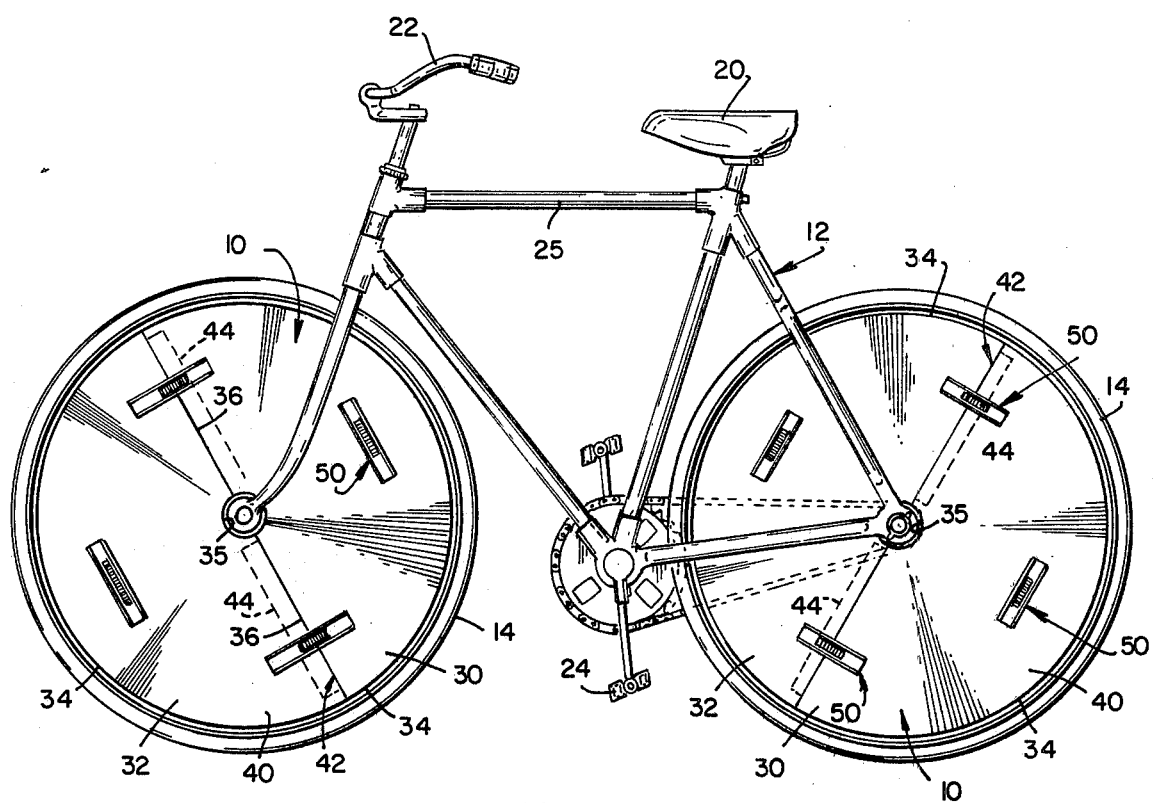
FIG. 1 is a side plan view of a bicycle that includes the cycle safety device of the present invention mounted on the front and rear wheels thereof.

Referring to the drawings, there is illustrated a safety disc assembly 10 associated with a conventional type of bicycle 12 having a front and rear wheel 14. Each wheel 14 has an axle 15, rim 16, and a plurality of radially extending spokes 18 between the axle 15 and rim 16 in a conventional manner. The bicycle 12 may include a seat 20 and handlebars 22, as well as pedals 24 of a conventional type.

The safety disc assembly 10 is intended to avoid injury to either the operator of the bicycle 12 or a passenger who may be seated on the support bar 25 or even handlebars 22. What often occurs is that the operator or passenger ends up inserting his or her shoe between the spokes 18 for various reasons not always explainable, which results in an accident with possible injury to either the operator and/or the passenger. The present invention of the assembly 10 prevents this from occurring in a simple and efficient manner.

The assembly 10 associated with each respective wheel 14 includes a first wheel disc 26 and a second wheel disc 28. This set of wheel discs 26 and 28 are referred to as the "first" and "second" for purposes of convenience only, since each wheel disc 26 and 28 may be identical in shape, size and configuration. Each wheel disc 26 and 28 is adapted to be mounted on the bicycle wheel 14 intermediate the rim 16 and axle 15 so as to substantially enclose same.

The first and second wheel discs 26 and 28, respectively, each include a pair of co-acting disc members 30 and 32. Each one of the disc members 30 and 32 includes a contoured outer perimeter 34 and a contoured inner perimeter 35, as illustrated in FIG. 1. A terminal wall 36 extends transversely therebetween.

The dimensional relationship of the assembled disc members 30 and 32 is such that the contoured outer perimeter 34 extends in spaced relationship to the rim 16 and the inner perimeter 35 extends in spaced relationship to the axle 15. Different size disc members 30 and 32 are provided for different size bicycles. In addition, the contoured outer perimeter 34 may take various forms but is illustrated to be semi-circular. In addition, the contoured inner perimeter 35 may also take various shapes and forms but is illustrated to be semi-circular also.

The disc members 30 and 32 may be fabricated from plastic, metallic or other materials, and may be of a reflective nature to also act as a safety feature. The disc members 30 and 32 may therefore be of substantially equal size, and in the assembled relationship the outer perimeters 35 form a circular configuration.

Figure 3:
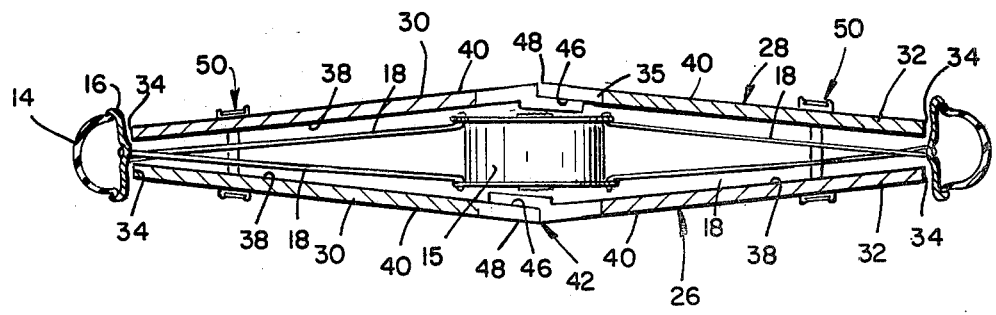
FIG. 3 is a view taken along lines 3—3 of FIG. 2.

The disc members 30 and 32 may further include oppositely disposed side walls 38 and 40 intermediate the contoured perimeters 34 and 35. The side wall 38 may be disposed adjacent to the spokes, and the side wall 40 may be disposed outwardly so that it is the wall that is viewed, as illustrated in FIG. 1. Therefore, wall 40 would be the one having any reflective material thereon to provide additional safety for night usage of the bicycle 12. As illustrated in FIG. 3, the spokes 18 are substantially confined or contained between the first and second wheel discs 26 and 28, respectively.

To assist the user during assembly and thereafter during use, alignment means 42 is provided for permitting abutting engagement between each pair of the disc members 30 and 32. The alignment means 42 further permits the disc members 30 and 32 of the first and second wheel discs 26 and 28, respectively, to be assembled on the wheel 14 without the removal thereof.

Figure 4:
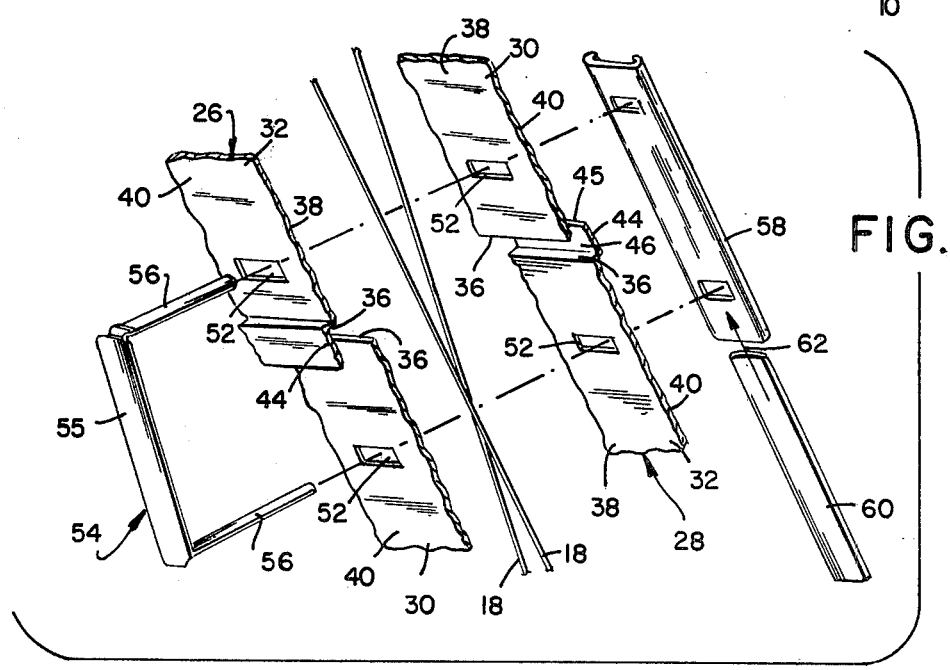
FIG. 4 is an enlarged fragmentary view illustrating the assembly of the components of the safety disc assembly.
Figure 2:
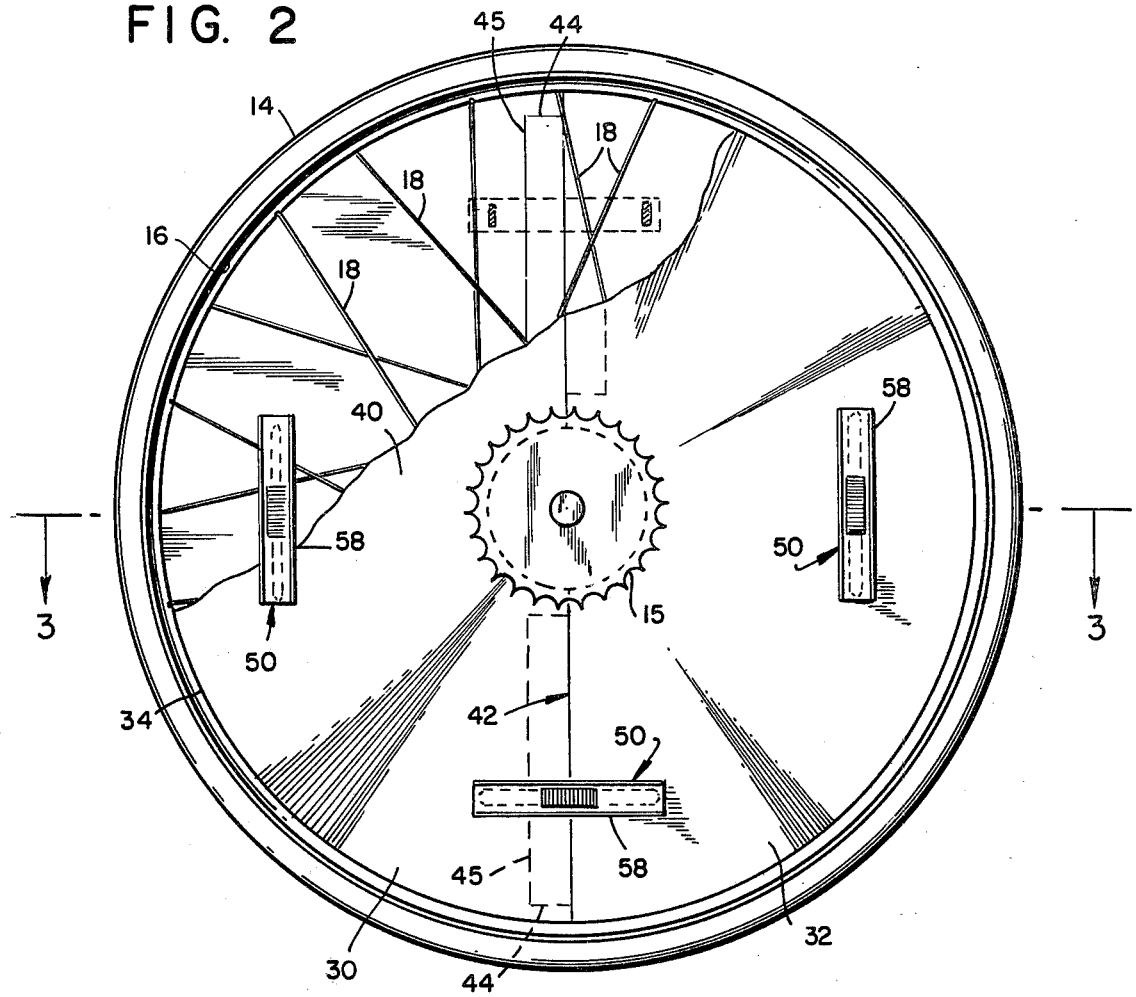
FIG. 2 is a side plan view of an individual wheel, with the cycle safety assembly partly broken away to illustrate the present invention.

The alignment means 42, as illustrated in FIGS. 3 and 4, includes a lip 44 extending outwardly from the terminal wall 36 on each one of the disc members 30 and 32. The lip 44 may be continuous and includes a free end 45, an inner end 46 and an outer end 48. Each lip 44 is adapted to extend in overlapping engagement with a disc member 30 or 32 in the assembled position of each wheel disc 26 and 28, as illustrated in FIG. 3. As illustrated, the inner ends 46 of each lip 44 extend in overlapping relationship to a disc member 30 or 32. In this manner an interfitting engagement is obtained to prevent movement of the disc members 30 and 32 relative to each other when the wheel 14 is rotating at a high speed. Each lip 44 may extend about one half the length of the terminal wall 36, as illustrated in FIG. 1.

The dimensional thickness of each lip 44 between the ends 46 and 48 may be about half the thickness between the respective walls 38 and 40 of the disc members 30 and 32. In this manner there may be no protrusion of a portion of the lip 44 beyond the surfaces of the side walls 38 and 40.

Coupling means 50 is provided for removably retaining the first and second wheel discs 26 and 28 in assembled relationship to each other on opposite sides of the spokes 18 on each wheel 14. The coupling means 50 may include apertures 52, as illustrated in FIG. 4, that are adapted to readily receive therethrough a pair of fasteners 54 that may have a base 55 with a pair of prongs 56 adapted to extend through the apertures 52 and spokes 18 into the corresponding apertures 52 on the opposite side of the spokes 18. A holding clamp 58 may be utilized with a slide member 60 that is moved in the direction of single headed arrow 62 when final assembly of the coupling means 50 is obtained.

The coupling means 50 as illustrated includes four sets of fasteners 54 which may be of a construction known in the art or of a special type. As illustrated, at least one pair of apertures 52 are on different disc members 30 and 32, that are adapted to receive prongs 56 from an individual fastener 54. In this manner the necessary physical securement between the respective disc members 30 and 32 is obtained to accomplish the desired end result.

It can be appreciated that the present invention provides for a simple and convenient manner of assembly of the co-acting disc members 30 and 32 on each side of the spokes 18 by use of the alignment means 42 and thereafter using the coupling means 50 to obtain the desired end result necessary to accomplish the purposes of the present invention.

Although an illustrative embodiment of the invention has been described in detail herein with reference to the accompanying drawings, it is to be understood that the invention is not limited to this precise embodiment, and that various changes and modifications may be effected therein without departing from the scope or spirit of the invention.

I claim:

1. A safety disc assembly for a bicycle having a wheel with an axle, rim, and a plurality of radially extending spokes between the axle and rim, said safety disc assembly comprising:

A. a first and second wheel disc, each said wheel disc adapted to be mounted on a bicycle wheel intermediate said rim and said axle on oppositely disposed sides of the spokes, B. said first and second wheel disc each including a pair of co-acting disc members, each one of said disc members including a contoured outer perimeter and a contoured inner perimeter with a terminal wall extending therebetween, said contoured perimeters adapted to extend in spaced relationship to the rim and to the axle, respectively, C. alignment means for permitting abutting engagement between each pair of said disc members on said first and second wheel disc so as to permit said disc members to be assembled on the wheel without the removal thereof, D. said alignment means includes:
  (1) a lip extending outwardly from said terminal wall on each one of said disc members,
  (2) said lips are adapted to extend in overlapping engagement with a portion of the other said disc member in the assembled position of each said wheel disc,
  (3) each said wheel disc includes one of said lips that extend between said inner perimeter and said outer perimeter,
  (4) each one of said lips includes a free end, an inner end and an outer end, and
  (5) said inner end of each one of said lips of said disc members is in overlapping relationship with a portion of a corresponding said disc member and said lip is continuous along its length thereof, E. coupling means for removably retaining said first and second wheel discs in assembled relationship to each other on opposite sides of the spokes on the wheel, F. said coupling means including:
  (1) at least two pair of apertures in each one of said wheel discs,
  (2) a pair of fasteners, each said fastener adapted to extend through one pair of said apertures, and the spokes for removably securing said first and second wheel discs to each other on opposite sides of the spokes,
  (3) each said fastener including a base with a pair of prongs adapted to extend through a respective one of said pairs of apertures, (4) a holding clamp associated with each said fastener, for retaining said prongs in removably fixed relationship with respect to said wheel discs, and (5) at least one of said pair of apertures formed in a respective pair of said disc members adjacent said terminal wall thereof such that said base and said holding clamp extend across said disc members so as to retain said lips in overlapping relationship during use of the bicycle, and G. said disc member each includes oppositely disposed side walls intermediate said contoured perimeters and said outer end of said lip coincides with one of said side walls.

2. The assembly as defined in claim 1, wherein said contoured outer perimeter is semi-circular.

3. The assembly as defined in claim 1, wherein said contoured inner perimeter is semi-circular.

4. The assembly as defined in claim 1, wherein each one of said disc members is of substantially equal size and said contoured outer perimeters form a circular configuration.

* * * * *